United States Patent [19]
Fukuda et al.

[11] Patent Number: 4,711,345
[45] Date of Patent: Dec. 8, 1987

[54] COMPOSITE-MOTION DRIVE UNIT AND COMBINATORIAL WEIGHING APPARATUS EMPLOYING THE SAME

[75] Inventors: Masao Fukuda; Yukio Kakita, both of Shiga; Kenji Ueda, Kyoto; Kiichi Terashima; Hiroshi Bochi, both of Shiga, all of Japan

[73] Assignee: Ishida Scales Mfg. Co., Ltd., Kyoto, Japan

[21] Appl. No.: 770,063

[22] Filed: Aug. 28, 1985

[30] Foreign Application Priority Data

Aug. 28, 1984 [JP] Japan .................................. 59-180142
Aug. 28, 1984 [JP] Japan ............................ 59-131186[U]
Aug. 28, 1984 [JP] Japan ............................ 59-131187[U]
Aug. 28, 1984 [JP] Japan ............................ 59-131188[U]

[51] Int. Cl.$^4$ ............................................. B65G 43/08
[52] U.S. Cl. ................................ 198/572; 198/504; 198/550.12; 198/718; 177/25
[58] Field of Search .................. 198/504, 505, 550.01, 198/550.4, 550.12, 717, 572, 372, 598, 571, 718, 621, 623; 177/25.18; 222/52, 55, 56, 77

[56] References Cited

U.S. PATENT DOCUMENTS 2,846,089  8/1958  Stewart ........................... 198/550.12
4,494,619  1/1985  Matsuno ........................... 177/25.18
4,569,405  2/1986  Oshima ............................... 198/505

*Primary Examiner*—Robert J. Spar
*Assistant Examiner*—Jonathan D. Holmes
*Attorney, Agent, or Firm*—Staas & Halsey

[57] ABSTRACT

A composite-motion drive unit comprises an electromagnet and a drive shaft extending through a hole defined in the electromagnet. The electromagnet and the drive shaft are energized and actuated independently of each other for driving distribution tables coupled respectively thereto in a composite motion pattern. A combinatorial weighing apparatus incorporating the composite-motion drive unit has sweep conveyors for transferring articles from the distribution tables, and a guide chute rotatable in a horizontal plane for distributing articles to be supplied to the distribution tables.

5 Claims, 10 Drawing Figures

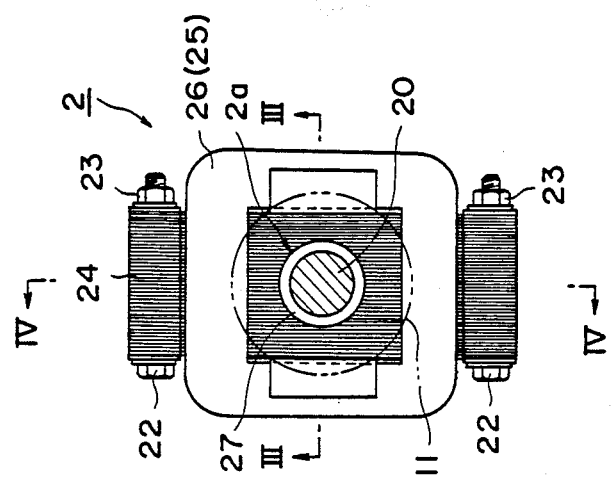
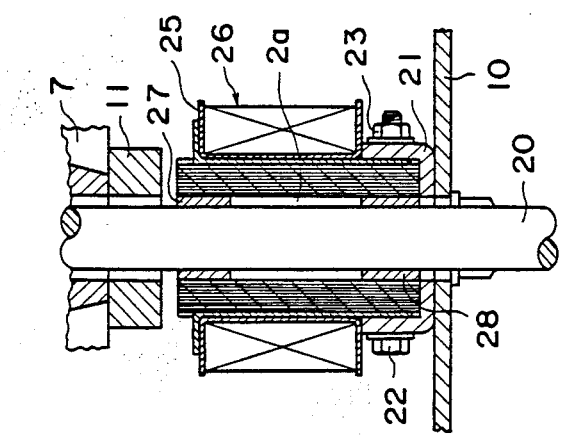
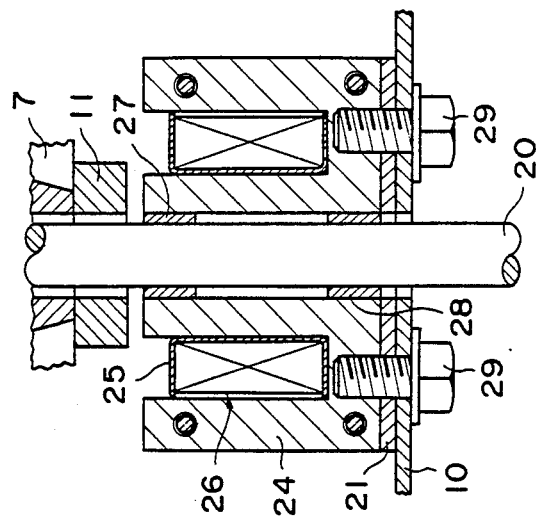

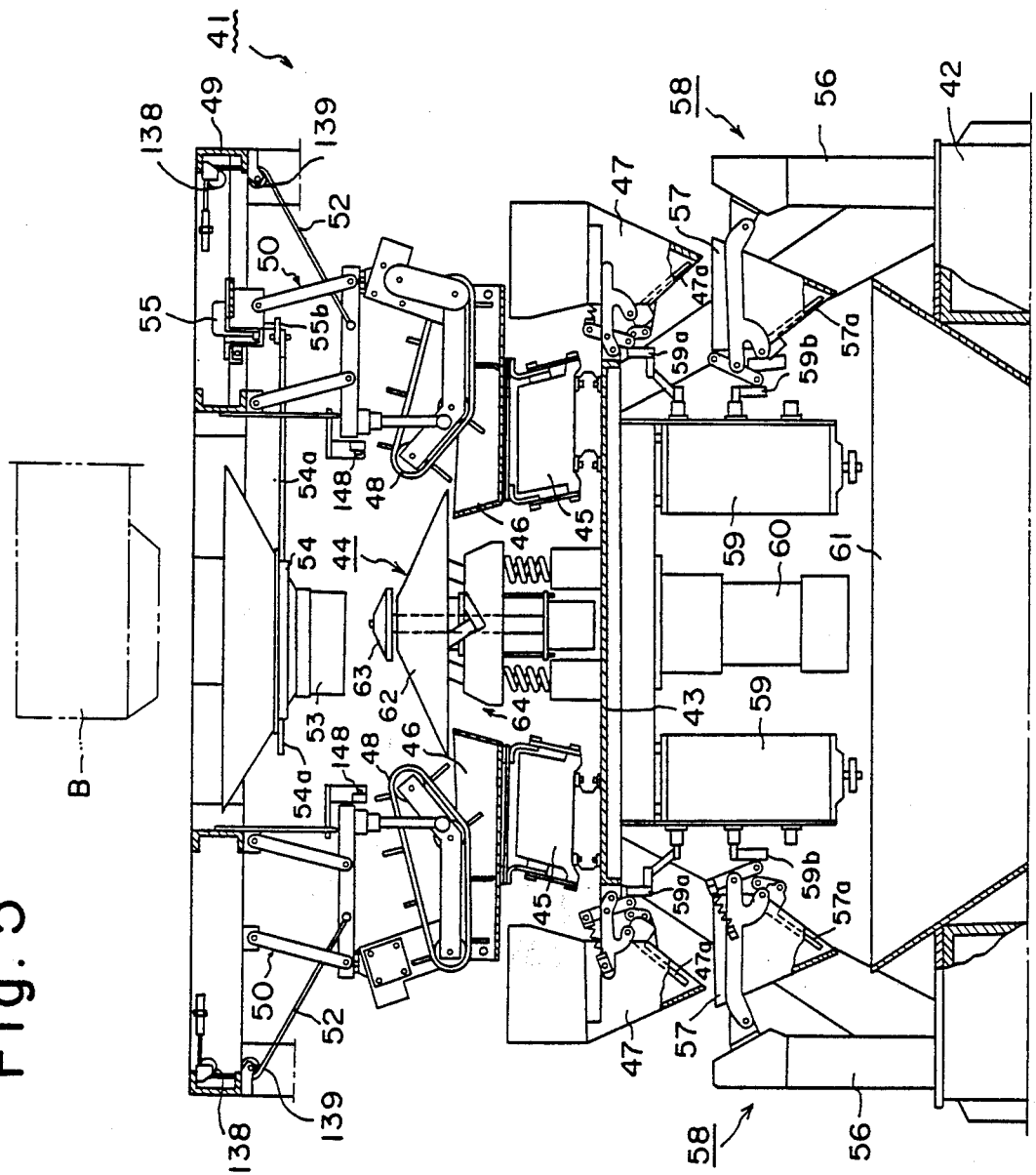

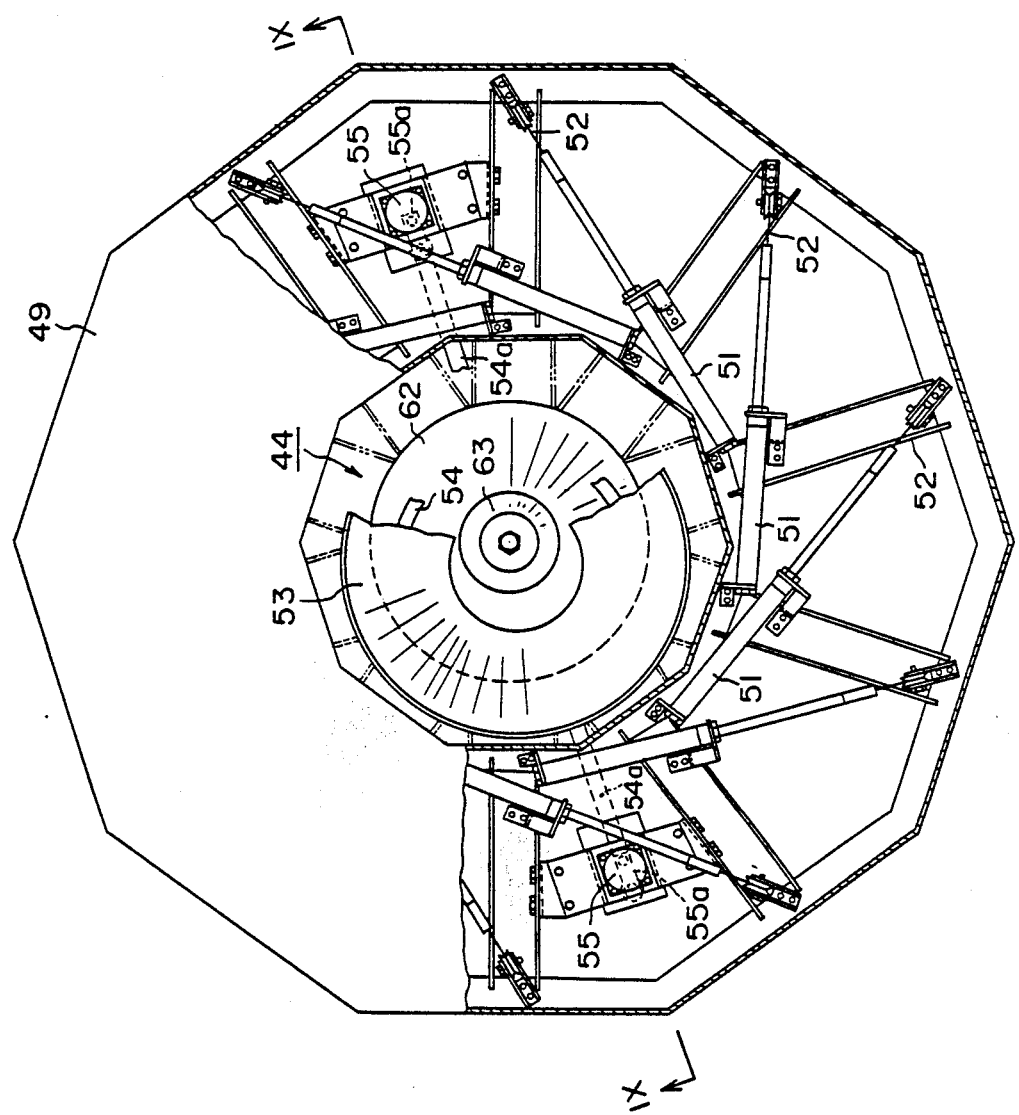

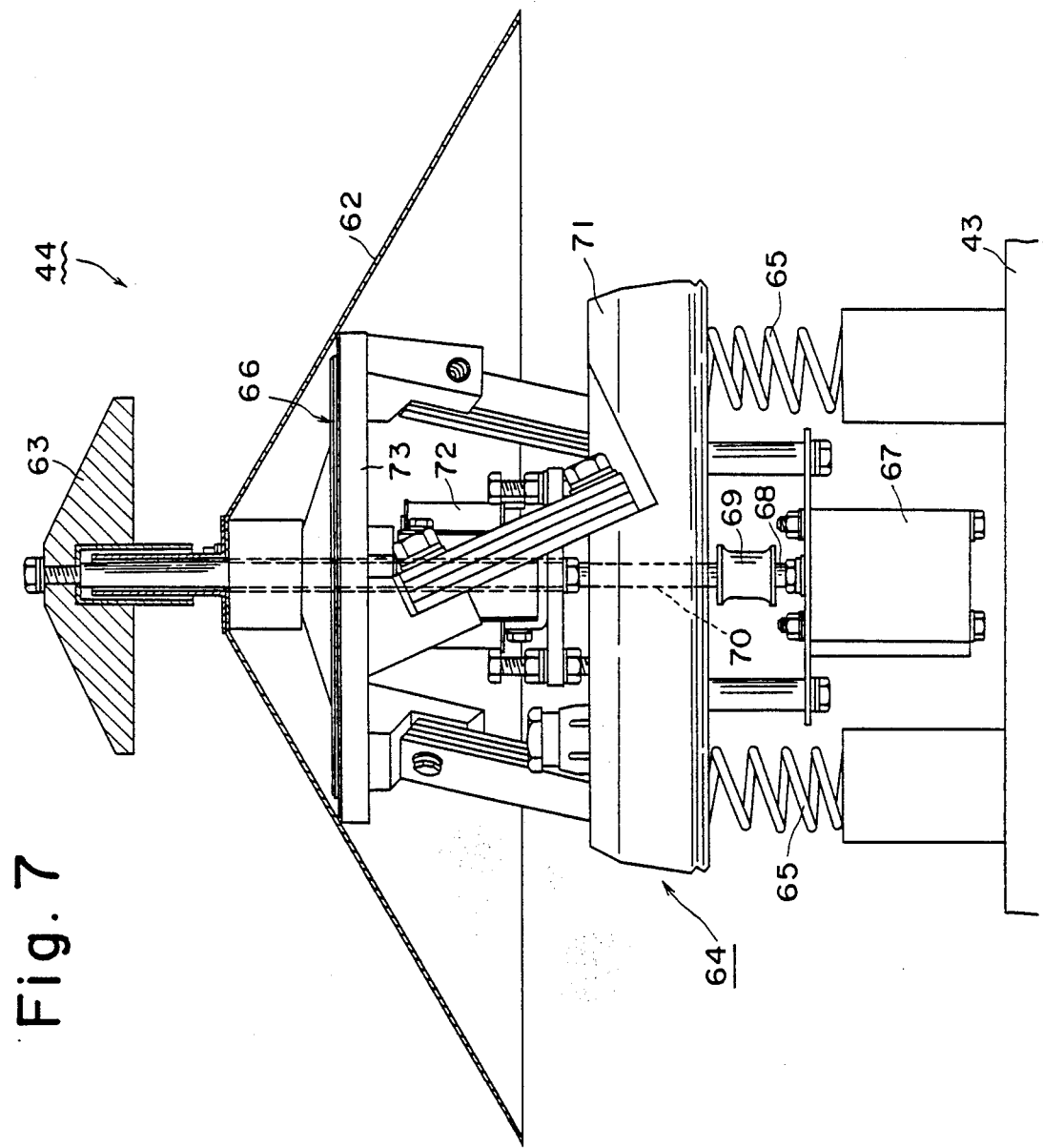

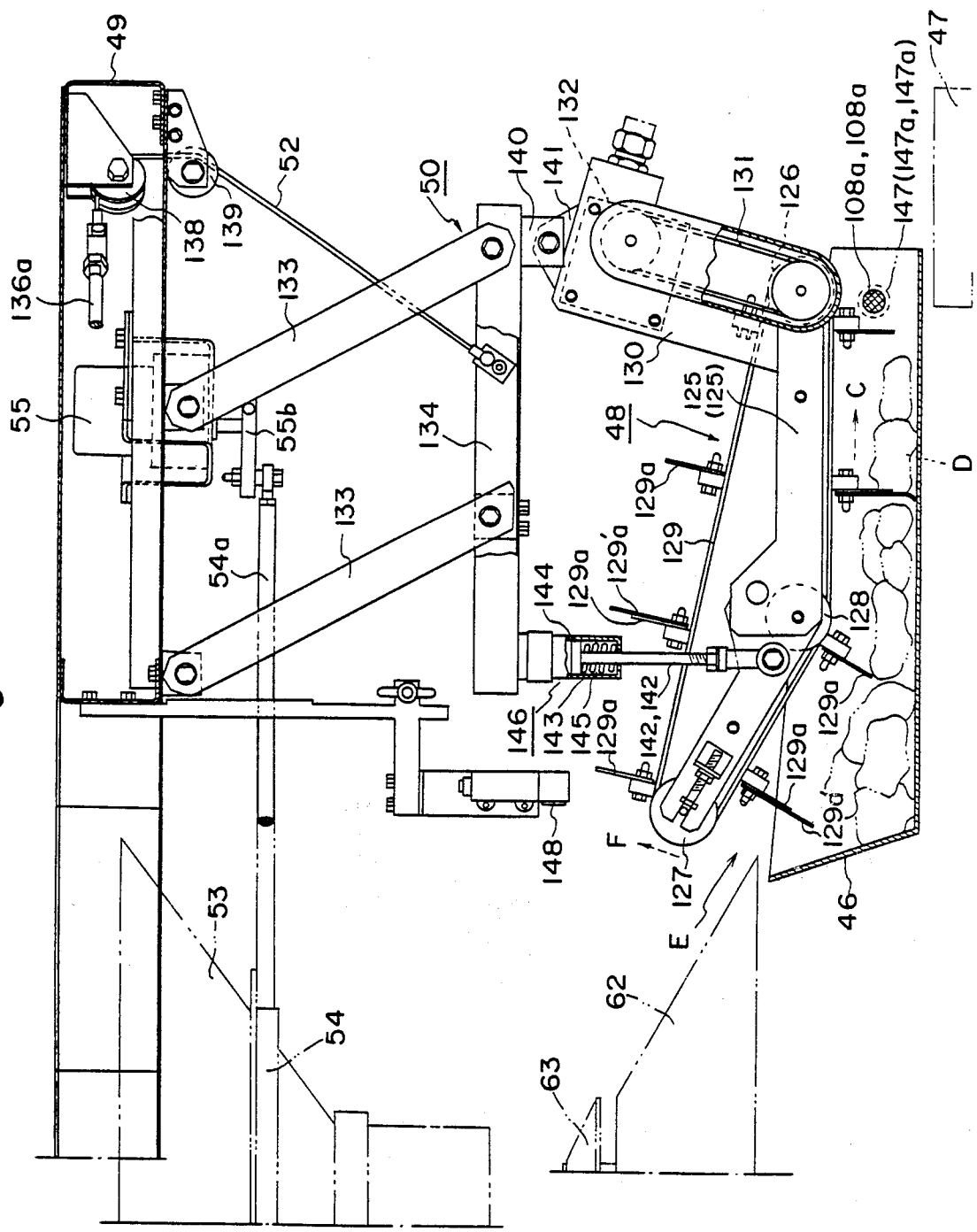

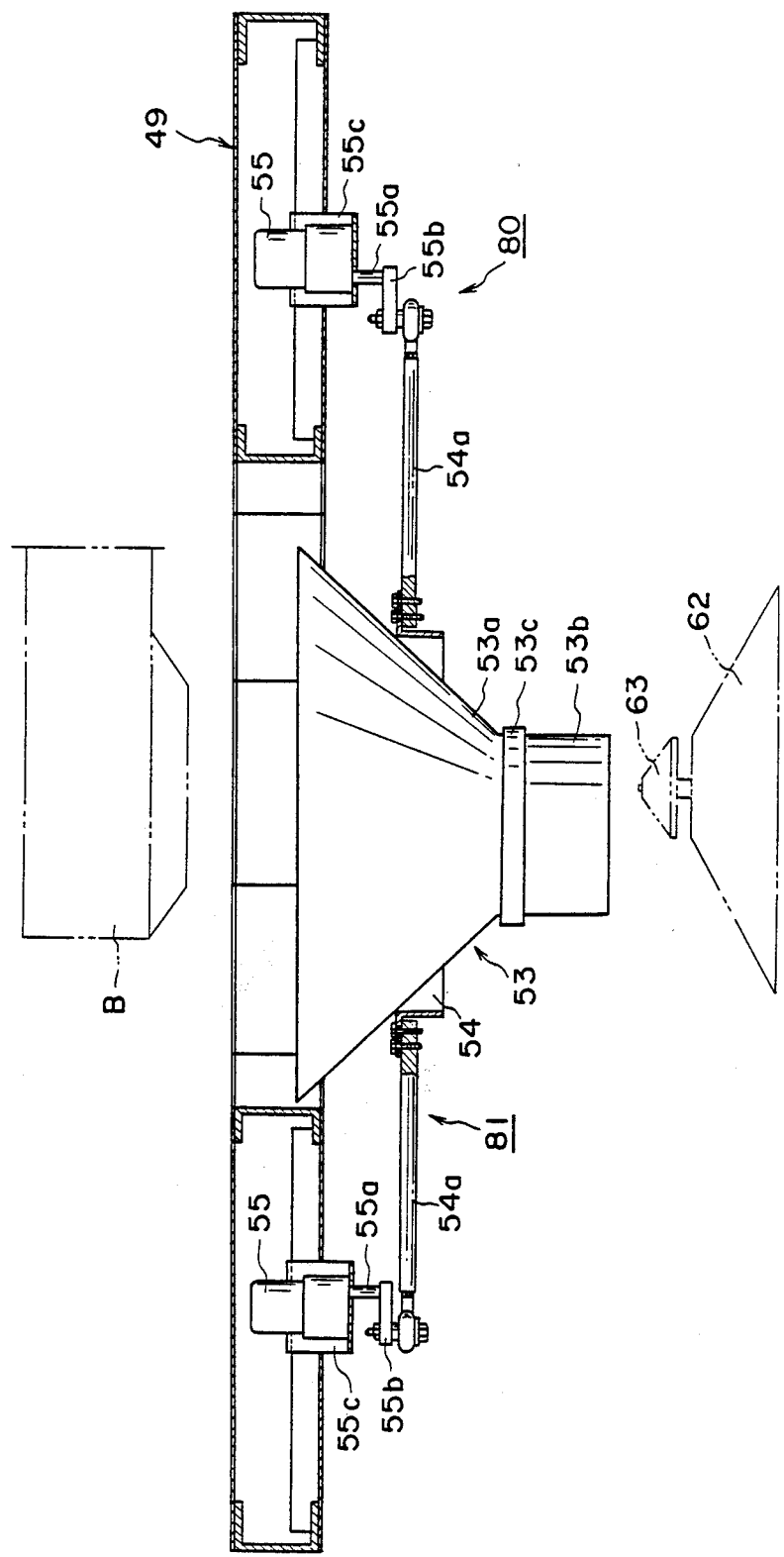

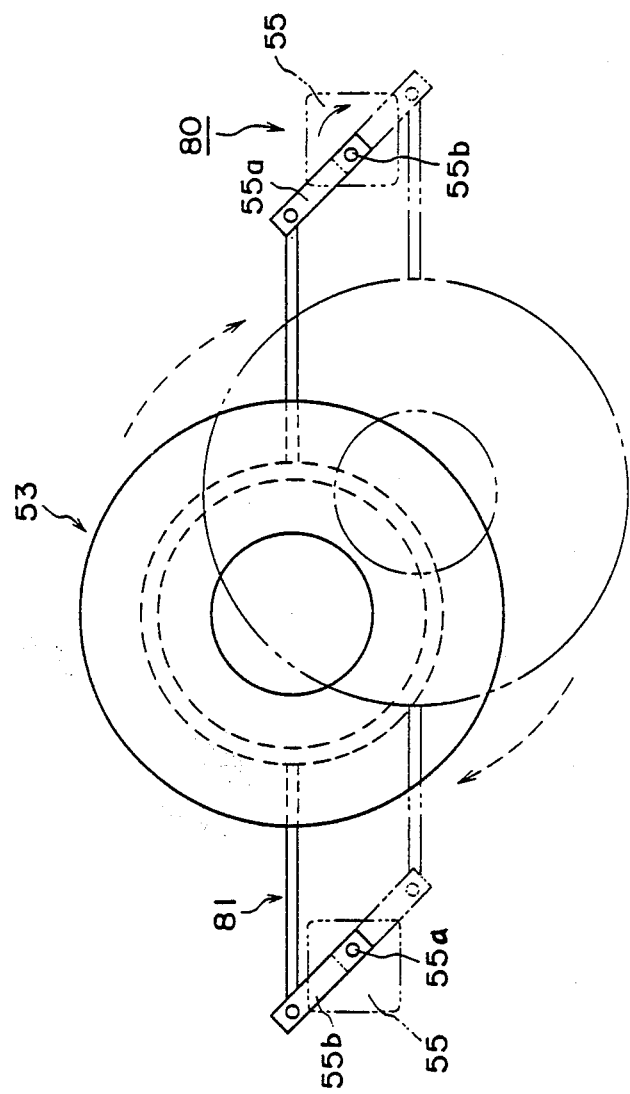

COMPOSITE-MOTION DRIVE UNIT AND COMBINATORIAL WEIGHING APPARATUS EMPLOYING THE SAME

BACKGROUND OF THE INVENTION

The present invention relates to a composite-motion drive unit employing an electromagnet and another drive source for driving two members independently of each other, and more particularly to an article distributing and supplying device in a combinatorial weighing apparatus employing such a composite-motion drive unit.

Combinatorial weighing apparatus for automatically weighing articles of merchandise have a central vibratable distributing and supplying device for substantially uniformly distributing and supplying the articles which have been charged from an upper source to a plurality of weighing machines or pool hoppers associated respectively therewith, the weighing machines being arranged in a circular pattern around the central distributing and supplying device. Where the articles to be weighed are pieces which tend to cling together and do not flow smoothly, such as dried and coiled strings of alimentary paste known as coil spaghetti, the articles are not uniformly distributed and supplied to the weighing machines only by the vibration of the distributing and supplying device. The articles are sometimes not sufficiently supplied to some weighing machines, resulting in lowered weighing accuracy of a weighing failure. One solution to this problem would be to operate the distributing and supplying device in a composite motion such as of vibration and vertical movement, or to construct the distributing and supplying device of a plurality of members actuatable in different motion patterns, for thereby preventing the articles from clinging to each other. However, such arrangements would be disadvantageous in that the drive mechanism for the distributing and supplying device would have to be much larger in size, making it difficult to position the distributing and supplying device in a limited space surrounded by the weighing machines.

SUMMARY OF THE INVENTION

It is an object of the present invention to provide a small-size composite-motion drive unit used in the distributing and supplying device in a combinatorial weighing apparatus, for individually driving first and second members of the distributing and supplying device in different motion patterns.

Another object of the present invention is to provide a small-size distributing and supplying device used in a combinatorial weighing apparatus and employing a composite-motion drive unit for individually driving first and second members of the distributing ad supplying device in different motion patterns to thereby cause articles which tend to cling together to be substantially uniformly distributed and supplied to a plurality of weighing machines or their pool hoppers.

Still another object of the present invention is to provide a combinatorial weighing apparatus capable of supplying articles which tend to cling together and do not flow well, such as coil spaghetti, quickly and reliably in prescribed quantities from a distributing table through supply troughs to weighing machines or their pool hoppers, so that the articles can be reliably supplied without a shortage or supply failure.

According to the present invention, there is provided a composite-motion drive unit including an electromagnet having an iron core and a coil wound therearound, a drive shaft extending through a hole defined in the electromagnet, a drive source for imparting rotary motion, linear reciprocating motion, or their combined motion to the drive shaft, a first member coupled to the electromagnet, and a second member coupled to the drive shaft, whereby the first and second members can be driven in composite motion.

According to the present invention, there is also provided a combinatorial weighing apparatus having a distributing and supplying device for distributing and supplying articles charged from an upper source to a plurality of weighing machines for effecting combinatorial weight computation, the distributing and supplying device including a main distribution table of larger diameter, an auxiliary distribution table of smaller diameter disposed above the main distribution table, and a means for imparting different motion patterns respectively to the main and auxiliary distribution tables.

The combinatorial weighing apparatus also has a plurality of supply troughs for distributing and supplying articles therethrough to the weighing machines for effecting combinatorial weight computation, a plurality of sweep conveyors disposed respectively above the supply troughs for forcibly transferring the articles from the supply troughs to the weighing machines, and a guide chute disposed above the distributing ad supplying device and rotatable in a horizontal plane about the axis of the distributing and supplying device for guiding and distributing the articles in a wide area over the distributing and supplying device.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is an enlarged cross-sectional view taken along line II—II of FIG. 1;

FIG. 3 is an enlarged cross-sectional view taken along line III—III of FIG. 2;

FIG. 4 is an enlarged cross-sectional view taken along line IV—IV of FIG. 2;

FIG. 5 is a side elevational view of a combinatorial weighing apparatus;

FIG. 6 is a plan view, partly broken away, of the combinatorial weighing apparatus shown in FIG. 5;

FIG. 7 is an enlarged front elevational view, partly in cross section, of a distributing and supplying device;

FIG. 8 is an enlarged side elevational view, partly in cross section, of a sweep conveyor and neighboring parts;

FIG. 9 is an enlarged cross-sectional view taken along line IX—IX of FIG. 6; and FIG. 10 is a plan view showing operation of a guide chute drive device.

DESCRIPTION OF THE PREFERRED EMBODIMENT

Figure 1:
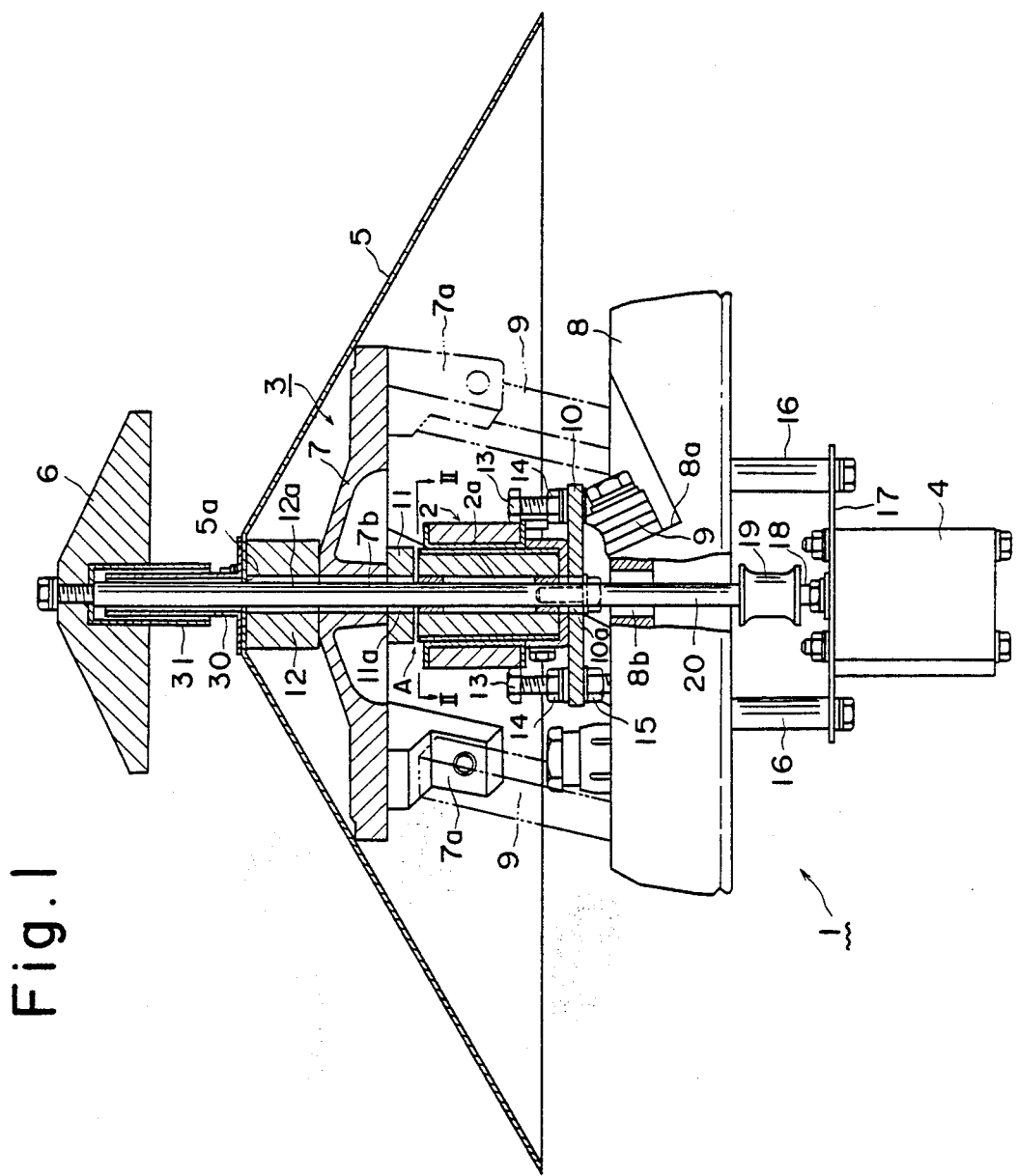
FIG. 1 is a vertical cross-sectional view of a composite-motion drive unit according to the present invention.

As shown in FIG. 1, a composite-motion drive unit 1 according to the present invention has a vibrator 3 including an electromagnet 2 and an air cylinder 4 for driving a first conical member 5 of larger diameter and a second conical member 6 of smaller diameter disposed above the first member 5 in concentric relation thereto.

The vibrator 3 has upper and lower bases 7, 8 extending parallel to each other and each having a plurality (four in the embodiment) of attachments 7a (8a). Leaf springs 9 are coupled between the corresponding pairs of the attachments 7a, 8a and inclined in one circumferential direction. The electromagnet 2 is mounted by an attachment plate 10 on the upper centeral surface of the lower base 8. An attractable member 11 is fixed to the lower central surface of the upper base 7 and spaced a gap A from the upper surface of the electromagnet 2. The first conical member 5 is supported on the upper base 7 with a spacer 12 interposed therebetween. The attachment plate 10 is attached to a plurality of bolts 13 projecting vertically from the upper surface of the lower base 8 by a plurality of nuts 14, 15 for vertical positional adjustment. The gap A between the electromagnet 2 and the attractable member 11 can be adjusted by the vertical positional adjustment of the attachment plate 10.

The air cylinder 4 is suspended from an attachment plate 17 fastened through spacers 16 to the lower surface of the lower base 8 of the vibrator 3. The air cylinder 4 has a piston rod 18 projecting upwardly and coupled through a vibroisolating rubber member 19 to a drive shaft 20.

The drive shaft 20 projects upwardly through the center of the vibrator 3 and has an upper end to which the second conical member 6 is fastened. The lower base 8, the attachment plate 10, the electromagnet 2, the attractable member 11, and the upper base 7, which jointly constitute the vibrator 3, have central holes 8b, 10a, 2a, 11a, 7b, respectively, through which the drive shaft 20 extends. The spacer 12 and the first member 5 also have respective central holes 12a, 5a through which the drive shaft 20 extends.

The electromagnet 2 will be described in greater detail with reference to FIGS. 2 through 4. The electromagnet 2 is composed of an iron core 24 composed of a number of E-shaped iron plates held together at their lower ends by a core frame 21 and fastened together by a plurality of bolts 22 and nuts 23, and a coil 26 composed of a conductor wound around a coil frame 25 fitted centrally over the iron core 24. The through hole 2a is defined centrally in the iron core 24 and the core frame 21. The drive shaft 20 extending through the hole 2a is vertically movably supported by sleeves 27, 28 fixedly fitted in the upper and lower ends of the through hole 2a. As illustrated in FIG. 4, the electromagnet 2 is fixed to the attachment plate 10 by bolts 29 threaded through the iron frame 21.

As shown in FIG. 1, a first sleeve 30 is secured to the upper end of the first member 5 in surrounding relation to the projection portion of the drive shaft 20. A second sleeve 31 is secured to the second member 6 in surrounding relation to the first sleeve 30. The first and second sleeves 30, 31 thus serve to prevent dust and other foreign matter from entering into the composite-motion drive unit through the hole 5a in the first member 5.

In operation, the coil 26 of the electromagnet 2 is supplied with intermitting currents to intermittently energize the electromagnet 2. When the electromagnet 2 is energized, the attractable member 11 fixed to the upper base 7 is attracted to the upper surface of the electromagnet 2 to displace the upper base 7 downwardly against the forces of the leaf springs 9. At this time, since the leaf springs 9 are tilted in one circumferential direction, the upper base 7 as it descends is spirally turned in the direction in which the leaf springs 9 are tilted. When the electromagnet 2 is de-energized, the attractable member 11 is released from the electromagnet 2 to allow the upper base 7 to return upwardly as it is spirally turned in the opposite direction under the resiliency of the leaf springs 9. Therefore, upon intermittent energization of the electromagnet 2, the upper base 7 and the first member 5 attached thereto are subject to spiral reciprocating movement.

The air cylinder 4 is intermittently supplied with air to move the piston rod 18 alternately upwardly and downwardly. The drive shaft 20 coupled by the vibroisolating rubber member 19 to the piston rod 18 is also moved upwardly and downwardly to vertially move the second member 6 coupled to the upper end of the drive shaft 20.

The first member 5 and the second member 6 are moved independently in different motion patterns by the vibrator 3 and the air cylinder 4. Inasmuch as the second member 6 is driven by the air cylinder 4 through the drive shaft 20 extending centrally through the vibrator 3, the composite-motion drive unit for driving the first and second members 5, 6 independently is small in size although the first and second members 5, 6 are positioned closely to each other in concentric relation. It has been confirmed that the through hole 2a in the electromagnet 2 does not cause any abnormal temperature rise of the electromagnet 2 in a two-day electromagnet energization test. While in the foregoing embodiment the second member 6 is driven by the air cylinder 4, the air cylinder 4 may be replaced with a motor for rotating the second member 6 through the drive shaft 20. Alternatively, the air cylinder 4 may be combined with a motor for moving the second member 6 in rotary and vertical motions.

A distributing and supplying device in a combinatorial weighing apparatus according to the present invention will be described below.

As shown in FIG. 5, the combinatorial weighing apparatus, generally designated at 41, includes a support table 43 disposed centrally above a base 42. The distributing and supplying device, generally denoted at 44, is mounted centrally on the support table 43. A plurality of supply troughs 46 are positioned around and radially outwardly of the distributing and supplying device 44 and supported on vibrators 45 disposed on the support table 43. Around the support table 43, there are disposed a plurality of pool hoppers 47 coupled to the circumferential edge of the support table 43 and disposed respectively below the radially outer ends of the supply troughs 46. Positioned above the supply troughs 46 are a plurality of sweep conveyors 48 for forcibly sweeping articles out of the supply troughs 46 into the pool hoppers 47. The sweep conveyors 48 are suspended by parallel link mechanisms 50 from an upper frame 49, and can be lifted to an upper retracted position from an operative position directly above the supply troughs 52 by means of wires 52 and cylinders 51 (see FIG. 6) disposed on the upper surface of the upper frame 49.

As shown in FIG. 8, each of the sweep conveyors 48 comprises a pair of side frames 125 (one shown), a drive roller 126, a follower roller 127 and an intermediate roller 128 positioned between and supported by the opposite ends and intermediate portions of the side frames 125, an endless belt 129 trained around the rollers 126, 127, 128 and having a plurality of sweep fins 129a projecting radially outwardly and attached at prescribed intervals, and a motor 132 connected by an auxiliary frame 130 to one of the side frames 125 for rotating the drive roller 126 through a belt 131. The sweep fins 129a are made of a flexible material. A longer auxiliary fin 129a' is attached in overlapping relation to every other fin 129a.

The sweep conveyor 48 is suspended from the upper frame 29 by the parallel link mechanism 50, as described above. The parallel link mechanism 50 is composed of a pair of parallel links 133 having upper ends pivotally coupled to the lower surface of the upper frame 49 and a horizontal link 134 to which the lower ends of the parallel links 133 are pivotally coupled. As shown in FIG. 6, the cylinders 51 are operatively associated with the respective sweep cylinders 48 and mounted on the upper frame 49. The cylinder 51 has a piston rod 136a (FIG. 8) coupled to one end of the wire 52 extending around pulleys 138, 139 and below the upper frame 49. The other end of the wire 52 is connected to the horizontal link 134 of the parallel link mechanism 50. The parallel link mechanism 50 and the sweep conveyor 48 are coupled to each other by brackets 140, 141 joined to one end of the horizontal link 134 and the auxiliary frame 130 and a pair of joint rods 142 connected to the other end of the horizontal link 134 and the side frames 125. Between each of the joint rods 142 and the horizontal link 134, there is provided a damper 146 composed of a tubular body 143 fixed to the horizontal link 134, a spring seat 144 slidably fitted in the tubular body 143 and connected to the upper end of the joint rod 142, and a spring 145 disposed between the spring seat 144 and the bottom of the tubular body 143. The rear end of the sweep conveyor 48 which is close to the follower roller 127 is resiliently supported by the damper 146 for vertical swinging movement.

As shown in FIG. 5, a guide chute 53 is disposed above the distributing and supplying device 44 for guiding articles which have been charged from a feed conveyor B onto the distributing and supplying device 44. The guide chute 53 is supported by a chute holder 54 on the upper frame 49. The chute holder 54 has a pair of side arms 54a coupled by crank arms 55b to the rotatable shafts 55a of a pair of motors 55. When the motors 55 are rotated, the guide chute 53 is rotated in a horizontal plane above the distributing and supplying device 44 about the axis thereof.

A drive device 80 for rotating the guide chute 53 will be described with reference to FIGS. 9 and 10. The drive device 80 is composed of the pair of motors 55 mounted by a pair of brackets 55c, respectively, on the upper frame 49 at diametrically opposite positions with respect to the guide shute 53, the motors 55 being rotatable in synchronism with each other, the pair of crank arms 55b having ends fixed to the motor shafts 55a so as to be kept in equal angular relation thereto at all times, and a chute holder assembly 81 coupled to the other ends of the crank arms 55b. The chute holder assembly 81 comprises the chute holder 54 and the pair of arms 54a having ends fixed to diametrically opposite portions of the chute holder 54 and extending linearly in opposite directions. The other ends of the arms 54a are coupled to the ends of the crank arms 55b remote from the motor shafts 55a. The guide chute 53 is fitted in the chute holder 54 of the chute holder assembly 81, and has a conical portion 53a engaging the chute holder 54.

Referring back to FIG. 5, a plurality of weighing machines 58 composed of weight detectors 56 and weighing hoppers 57 coupled respectively to the weight detectors 56 are mounted in a circular pattern on the base 42 and positioned respectively below the pool hoppers 47. A plurality of hopper opening and closing devices 59 are attached to the lower surface of the support table 43 in radial alignment with the radial pairs of the pool hoppers 47 and the weighing hoppers 57. The hopper opening and closing devices 59 are operated by a motor 60 fixed to the lower surface of the support table 43. When an article discharge command is received, the hopper opening and closing devices 59 are actuated by the motor 60 to project pushers 59a, 59b to open gates 47a, 57a of the pool hoppers 47 and the weighing hoppers 57 which are positioned laterally of the devices 59, respectively. Below the weighing hoppers 57, there is positioned a collection chute 61 for collecting the articles discharged from the weighing hoppers 57 and supplying them to a packaging machine (not shown) located below the collection chute 61.

The distributing and supplying device 44 has a first conical distribution table 62 of larger diameter and a second conical distribution table 63 of smaller diameter disposed above the first distribution table 62 in concentric relation thereto. The distribution tables 62, 63 are drivable by a composite-motion drive unit 64 which is identical to the composite-motion derive unit 1 shown in FIG. 1. As shown in FIG. 7, the composite-motion drive unit 64 is supported by springs 65 on the support table 43 and has a vibrator 66 and an air cylinder 67 having a piston rod 68 coupled via a vibroisolating rubber member 69 to a drive shaft 70. The drive shaft 70 extends upwardly through the centers of a lower base 71, an electromagnet 72, and an upper base 73 which constitute the vibrator 66. The first distribution table 62 is attached to the upper base 73, and the second distribution table 63 is attached to the upper end of the drive shaft 70. The first distributing table 62 is caused by the vibrator 66 to effect spiral reciprocating movement. The second distribution table 63 is caused by the air cylinder 67 to make vertical movement.

Operation of the combinatorial weighing apparatus 41 is as follows: Articles charged from the feed conveyor B are passed through the guide chute 53 which is rotated in a horizontal plane above the distributing and supplying device 44 about the axis thereof, and scattered by the guide chute 53 onto the distributing and supplying device 44. The distributing and supplying device 44 then supplies the articles into the supply troughs 46 disposed radially outwardly of the device 44. The articles are then delivered through the supply troughs 46 into the pool hoppers 47 by the vibrations imparted by the vibrators 45 to the supply troughs 46 and also by the sweep conveyors 48.

More specifically, as shown in FIG. 8, the endless belt 129 of each sweep conveyor 48 is driven by the motor 132 to travel in the direction of the arrow C to cause the sweep fins 129a and the auxiliary fins 129a' on the endless belt 129 to forcibly move the articles D through the supply hopper 46 to the pool hopper 47. Therefore, the articles in prescribed amounts are quickly and reliably supplied from the first distributing table 62 to the pool hoppers 47, and can be supplied to the pool hoppers 47 and hence the weighing hoppers 57 without an unwanted supply shortage or failure. As a result, the process of combinatorial weighing can accurately be effected by the weighing machines 58. The longer auxiliary fin 129a' attached to every other sweep fin 129a is held in sliding contact with the bottom of the supply trough 46 for reliably discharging fractions or broken pieces of the articles D out of the supply trough 46. The articles as they are introduced from the first distribution table 62 into the supply trough 46 pass through an entry slot E. Although the entry slot E is temporarily closed off by the auxiliary fins 129a' as the endless belt 129 travels, they do not prevent the articles from entering through the entry slot E into the supply trough 46 since the auxiliary fin 129a' is attached to every other sweep fin 129. Because the sweep conveyor 48 is resiliently supported at its rear portion by the damper 146, the sweep conveyor 48 is forced upwardly in the direction of the arrow F (FIG. 8) by a temporary influx of articles from the entry slot E into the supply trough 46. As a consequence, the articles are prevented from getting jammed between the sweep conveyor 48 and the supply trough 46. As illustrated in FIG. 8, the side panels of the supply trough 46 at its radial outer end having respective meshed holes 108a, and there is a photoelectric sensor 147 composed of light-emitting and light detector elements 147a, 147a for emitting and detecting light through the meshed holes 108a. The photo-electric sensor 147 serves to detect whether articles are present at the radially outer end of the supply trough 46. If articles in a next batch to be supplied have not reached the radially outer end of the supply trough 46 after the supply trough 46 and the sweep conveyor 46 were operated for a certain period of time, then the sweep conveyor 48 is continuously actuated until the articles arrive at the radially outer end of the supply trough 46. Consequently, any shortage of the articles supplied in a next batch to the pool hopper 47 is reliably prevented.

The feed conveyor B for supplying articles onto the first distribution table 62 is not in continuous operation. It is operated when a photoelectric level sensor composed of a pair of elements 148, 148 (FIG. 5) indicates that the height of articles stacked on the first distribution table 62 is below a prescribed level. The feed covenyor B as it is operated charges articles onto the first distribution table 62 until the height of the articles thereof reach the prescribed level.

When the gates 47a of the pool hoppers 47 are opened by the hopper opening and closing devices 59, the articles are charged from the pool hoppers 47 into the weighing hoppers 47 of the weighing machines 58. With the articles supplied in the weighing hoppers 57, the weight detectors 56 weigh the articles in the weighing hoppers 57, and a combinatorial computing process is effected on the detected weights to select an optimum weight combination which is equal to a prescribed target weight or closest thereto within a prescribed tolerance. The gates 57a of the weighing hoppers 57 of those weighing machines 58 which give such an optimum weight combination are opened by the hopper opening and closing devices 59 for discharging the articles into the collection chute 61. The collection chute 61 then discharges the supplied articles to the non-illustrated packaging machine. Those weighing hoppers 57 which have discharged the articles are immediately supplied with articles to be weighed next from the corresponding pool hoppers 47, which are in turn supplied with articles from the distributing and supplying device 44 through the respective supply troughs 46 and sweep conveyors 48.

Where the articles are such pieces as to be apt to cling together and fail to flow smoothly, such as coil spaghetti, they would tend to cling together and be localized on the distritubing and supplying device. When some of the weighing machines 58 are successively selected to give an optimum weight combination, and articles are successively supplied from the distributing and suppyling device 44 through the corresponding supply troughs 46 and pool hoppers 47 to the weighing hoppers 57 of the corresponding weighing machines 58, then the areas on the distributing and supplying device 44 which correspond to the successively selected weighing machines 58 run short of articles, resulting in a localized disposition of articles on the distributing and supplying device 44. Should this condition happen, the articles would be insufficiently supplied to some weighing machines 58 (i.e., weighing hoppers 57), and the accuracy of combinatorial weighing operation would be lowered and a weighing failure would result.

With the arrangement of the present invention, the first distribution table 62 of larger diameter is enabled by the vibrator 66 to make spiral reciprocating motion, and the second distribution table 63 of smaller diameter disposed centrally over the first distribution table 62 is enabled by the air cylinder 67 to move upwardly and downwardly through the drive shaft 70. Therefore, the articles charged from the guide chute 53 onto the distributing and supplying device 44 are first scattered around as they drop on the second distribution table 63, and are prevented from clinging together when they are deposited on the second and first distribution tables 63, 62 since the tables 63, 62 operate in different motion patterns. As a result, the articles on the distributing and supplying device 44 are prevented from being localized thereon. Unwanted article shortages in some of the weighing machines 58 (i.e., their weighing hoppers 57) are therefore also prevented to elimite lowered weighing accuracy and weighing failure which would otherwise be caused.

When the motors 55 in the drive device 80 shown in FIGS. 9 and 10 are energized to rotate in synchronism, the crank arms 55b are rotated in parallel relation to each other at all times to cause the chute holder assembly 81 coupled between the distal ends of the arms 55b or the guide chute 53 held centrally on the chute holder assembly 81 to rotate in a horizontal plane about the axis of the first distribution table 62, which is positioned at the intermediate point on the straight line interconnecting the motor shafts 55a. Therefore, the articles supplied from the feed conveyor B into the guide chute 53 are scattered in a wide area on the first distribution table 62 by the rotary motion of the guide shut 53, and hence are uniformly dispersed and supplied on the table 62. This also prevents article shortages which would otherwise be occasioned in some weighing machines 58 by article localization on the first distribution table 62, and reduced weighing accuracy and weighing failure that would otherwise be caused by such article shortages are also prevented. The drive shaft 70 through which the second distribution table 63 is driven by the air cylinder 67 extends centrally through the vibrator 66 which drives the first distribution table 62. With this structure, the first and second distribution tables 62, 63 which are disposed closely in concentric relation to each other can independently be driven by the composite-motion drive unit 64 which is small in size.

The air cylinder 67 may be replaced with a motor or combined with a motor for rotating the second distribution table 63 or imparting rotary and vertical motions to the second distribution table 63.

According to the present invention, the composite-motion drive unit is small in size for driving the two tables independently in different motion patterns. The distributing and supplying device employed in the combinatorial weighing apparatus and incorporating the composite-motion drive unit can supply articles which are liable to cling together and do not flow well, substantially uniformly to the weighing machines.

Although a certain preferred embodiment has been shown and described, it should be understood that many changes and modifications may be made therein without departing from the scope of the appended claims.

What we claim is:

1. A combinatorial weighing apparatus having a plurality of vibratory supply troughs for distributing and supplying articles therethrough to a plurality of weighing machines for effecting combinatorial weight computation, said combinatorial weighing apparatus comprising:

a plurality of sweep conveyors disposed respectively above said supply troughs for forcibly transferring the articles from said supply troughs to said weighing machines; and means for continuously actuating said sweep conveyors until articles reach the ends of respective supply troughs when the articles have not reached said ends of the supply troughs for a prescribed period of time at the time said supply troughs and said sweep conveyors are operated to transfer the articles toward said weighing machines.

2. A combinatorial weighing apparatus according to claim 1, including a frame disposed above said sweep conveyors, each of said sweep conveyors being suspended from said frame and vertically movable between a sweep position directly above one of said supply troughs and a retracted position above said sweep position.

3. A combinatorial weighing apparatus according to claim 2 wherein one end of each of said supply troughs is resiliently connected to said frame.

4. A combinatorial weighing apparatus according to claim 3 wherein the other end of said supply trough is pivotally connected to said frame.

5. A combinatorial weighing apparatus according to claim 1 wherein each of said sweep conveyors includes a movable belt having a plurality of sweep fins extending outwardly therefrom and wherein certain spaced ones of said sweep fins have a longer auxilliary fin attached thereto.

* * * * *